(12) United States Patent
Swindell

(10) Patent No.: US 9,026,629 B2
(45) Date of Patent: May 5, 2015

(54) GRACEFUL OUT-OF-BAND POWER CONTROL OF REMOTELY-MANAGED COMPUTER SYSTEMS

(75) Inventor: Rob Swindell, Norco Hills, CA (US)

(73) Assignee: Broadcom Corporation, Irvine, CA (US)

( * ) Notice: Subject to any disclaimer, the term of this patent is extended or adjusted under 35 U.S.C. 154(b) by 336 days.

(21) Appl. No.: 13/015,969

(22) Filed: Jan. 28, 2011

(65) Prior Publication Data

US 2012/0173899 A1     Jul. 5, 2012

Related U.S. Application Data

(60) Provisional application No. 61/428,605, filed on Dec. 30, 2010.

(51) Int. Cl.
G06F 1/00 (2006.01)
G06F 15/173 (2006.01)
G06F 1/26 (2006.01)
H04L 12/10 (2006.01)
H04L 12/24 (2006.01)

(52) U.S. Cl.
CPC ............... *G06F 1/266* (2013.01); *H04L 12/10* (2013.01); *H04L 41/04* (2013.01)

(58) Field of Classification Search
USPC ................................ 709/223; 713/300–340
See application file for complete search history.

(56) References Cited

U.S. PATENT DOCUMENTS

| 7,793,122 | B1 * | 9/2010 | Manuilov ..................... 713/300 |
| 8,171,321 | B2 | 5/2012 | Kumar et al. |
| 2002/0194415 | A1 * | 12/2002 | Lindsay et al. .............. 710/305 |
| 2004/0213289 | A1 * | 10/2004 | Liu et al. ....................... 370/469 |
| 2005/0060587 | A1 * | 3/2005 | Hwang et al. ................ 713/300 |
| 2006/0190736 | A1 * | 8/2006 | John et al. ..................... 713/182 |
| 2007/0079151 | A1 * | 4/2007 | Connor et al. ................ 713/300 |
| 2007/0250723 | A1 * | 10/2007 | Shima et al. .................. 713/300 |
| 2008/0120483 | A1 * | 5/2008 | Kobayashi et al. ........... 711/162 |
| 2008/0178267 | A1 * | 7/2008 | Rajagopal et al. ................ 726/4 |
| 2008/0219196 | A1 * | 9/2008 | Ptasinski ....................... 370/311 |
| 2010/0078999 | A1 * | 4/2010 | Celenza et al. ................. 307/31 |
| 2010/0235834 | A1 * | 9/2010 | Faasse et al. ..................... 718/1 |

FOREIGN PATENT DOCUMENTS

CN     101470518 A     7/2009

OTHER PUBLICATIONS

Simply-ware, WMI Shutdown tool, Nov. 11, 2006, www.simply-ware.com.*
Office Action directed to related Chinese Patent Application No. 201110448589.8, mailed Nov. 15, 2014, 4 pages.

* cited by examiner

*Primary Examiner* — Andrew Nalven
*Assistant Examiner* — Khang Do
(74) *Attorney, Agent, or Firm* — Sterne Kessler Goldstein & Fox P.L.L.C.

(57) ABSTRACT

A system, method, and computer program product are provided for remote management of a computer system using graceful power control commands. A management controller is able to receive commands from a remote management console to perform a graceful power control command (e.g., power-down, hibernate). The management controller stores the graceful power control command in a shared memory and notified (e.g., via interrupt) a management agent that the graceful power control command is present. The management agent retrieves the graceful power control command and invokes an appropriate operating system command. The management agent can also provide result information to the management controller.

21 Claims, 9 Drawing Sheets

GRACEFUL OUT-OF-BAND POWER CONTROL OF REMOTELY-MANAGED COMPUTER SYSTEMS

CROSS-REFERENCE TO RELATED APPLICATIONS

This application claims the benefit of U.S. Provisional Patent Application Ser. No. 61/428,605, filed Dec. 30, 2010, entitled "Graceful Out-of-Band Power Control of Remotely-Managed Computer Systems," which is incorporated herein by reference in its entirety.

BACKGROUND OF INVENTION

1. Field of the Invention

The present invention relates generally to power management and, more specifically, to remote graceful power management.

2. Description of the Background Art

Existing managed client computer systems and their integrated management controllers typically adhere to the Alert Standard Format ("ASF") specification for platform-internal management communications. The ASF specification defines ungraceful power control commands where a management controller receives a power control request from a remote management console.

Historically, out-of-band management controllers integrated into managed client computer systems have only allowed remote management consoles to perform ungraceful remote power operations (e.g., power-up, power-down, power-reset, etc.). These power control operations occur at the hardware level, such that a functioning host operating system would not be made aware of an impending power state change. As a result, an ungraceful power state change can cause data loss due to possible file system corruption, as well as delays associated with operating system integrity checks on a subsequent boot-up.

Due to the possible damage associated with an ungraceful power state change, ASF power control has always been intended to be used as a last resort to, for example, restart a locked-up system. However, this limits a remote administrator's ability to manage a fully-functional system.

Accordingly, what is desired is a mechanism by which to manage graceful power state changes.

SUMMARY OF INVENTION

Embodiments of the invention include a method comprising filtering a network packet comprising a graceful power control command, interpreting the network packet to obtain the graceful power control command, storing the graceful power control command in a shared memory, and notifying a power management agent service of arrival of the graceful power control command.

Additional embodiments of the invention include a computer-readable medium having computer-executable instructions stored thereon that, if executed by a computing device, cause the computing device to perform operations comprising filtering a network packet comprising a graceful power control command, interpreting the network packet to obtain the graceful power control command, storing the graceful power control command in a shared memory, and notifying a power management agent service of arrival of the graceful power control command.

Further embodiments of the invention include a system comprising a memory configured to store modules comprising a filtering module configured to filter a network packet comprising a graceful power control command, an interpreting module configured to interpret the network packet to obtain the graceful power control command, a storing module configured to store the graceful power control command in a shared memory, and a notifying module configured to notify a power management agent service of arrival of the graceful power control command, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
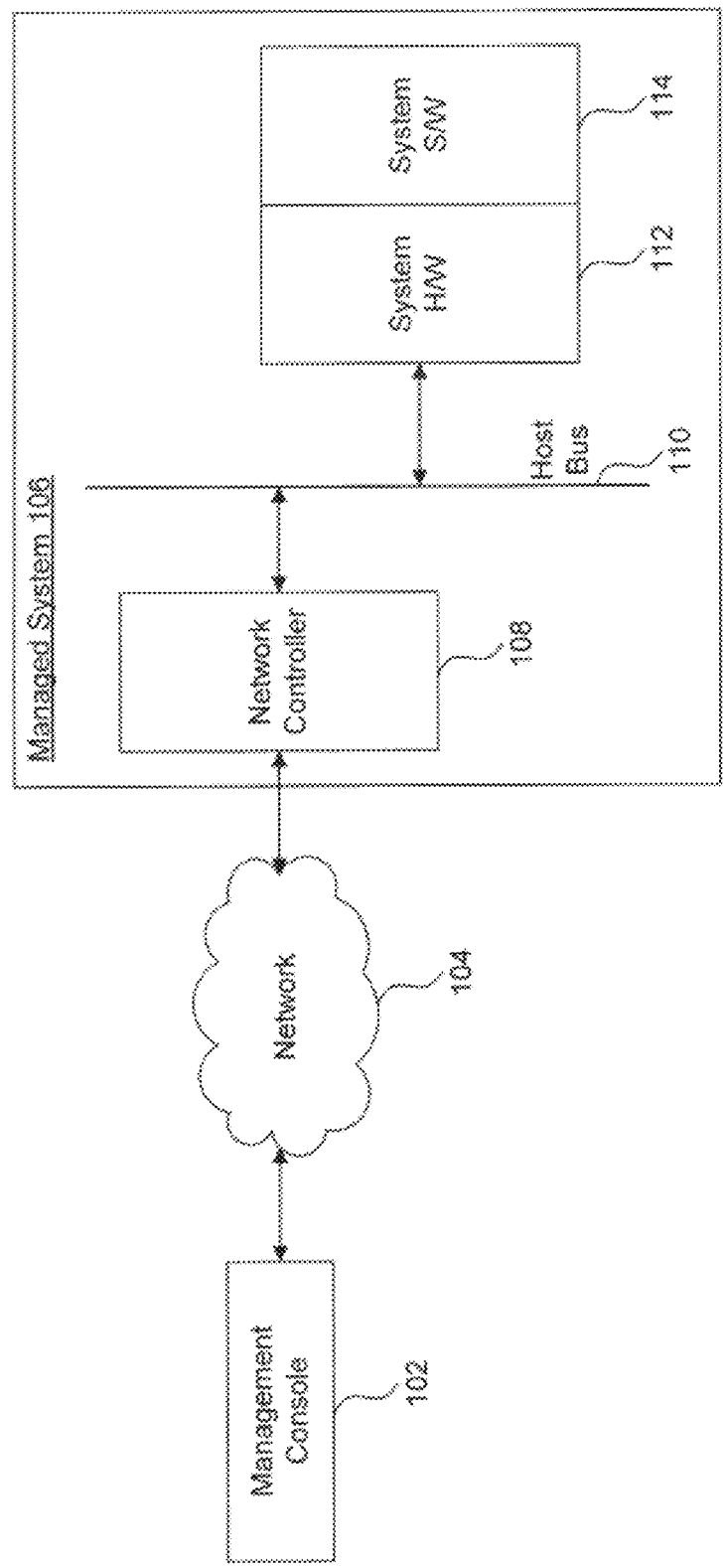
FIG. 1 illustrates a remotely-managed system environment, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

FIG. 1 illustrates a remotely-managed system environment 100, in accordance with an embodiment of the present invention. Environment 100 includes a management console 102, which is used by a network administrator to remotely issue, by way of non-limiting example, power control commands. These power control commands are transmitted over network 104 to a managed system 106. One skilled in the relevant arts will recognize that network 104 is typically an enterprise local area network ("LAN") utilizing Ethernet communications, although other configurations for networking management console 102 and managed system 106 can be utilized instead.

Managed system 106 is configured to receive communications from network 104 via a network controller 108. Network controller 108 interfaces with other system hardware 112 via a host bus 110. In accordance with a non-limiting exemplary embodiment, network controller 108 is a Peripheral Component Interconnect Express ("PCIe") network expansion card connected to a PCIe host bus 110, although one skilled in the relevant arts will understand that the concepts described herein can be utilized with different hardware configurations.

Network controller 108 communicates power management commands to system hardware 112, and consequently to system software 114 running thereupon, via host bus 110. Interaction of the aforementioned components in order to provide graceful power state management, in accordance with an embodiment of the present invention, is described in further detail below.

Although managed system 106 is primarily described in the context of a personal computer running a software operating system, one skilled in the relevant arts will appreciate that the techniques disclosed herein can be applied to remote power management of a number of other devices, including embedded applications and servers.

II. Network Controller Operation

Figure 2:
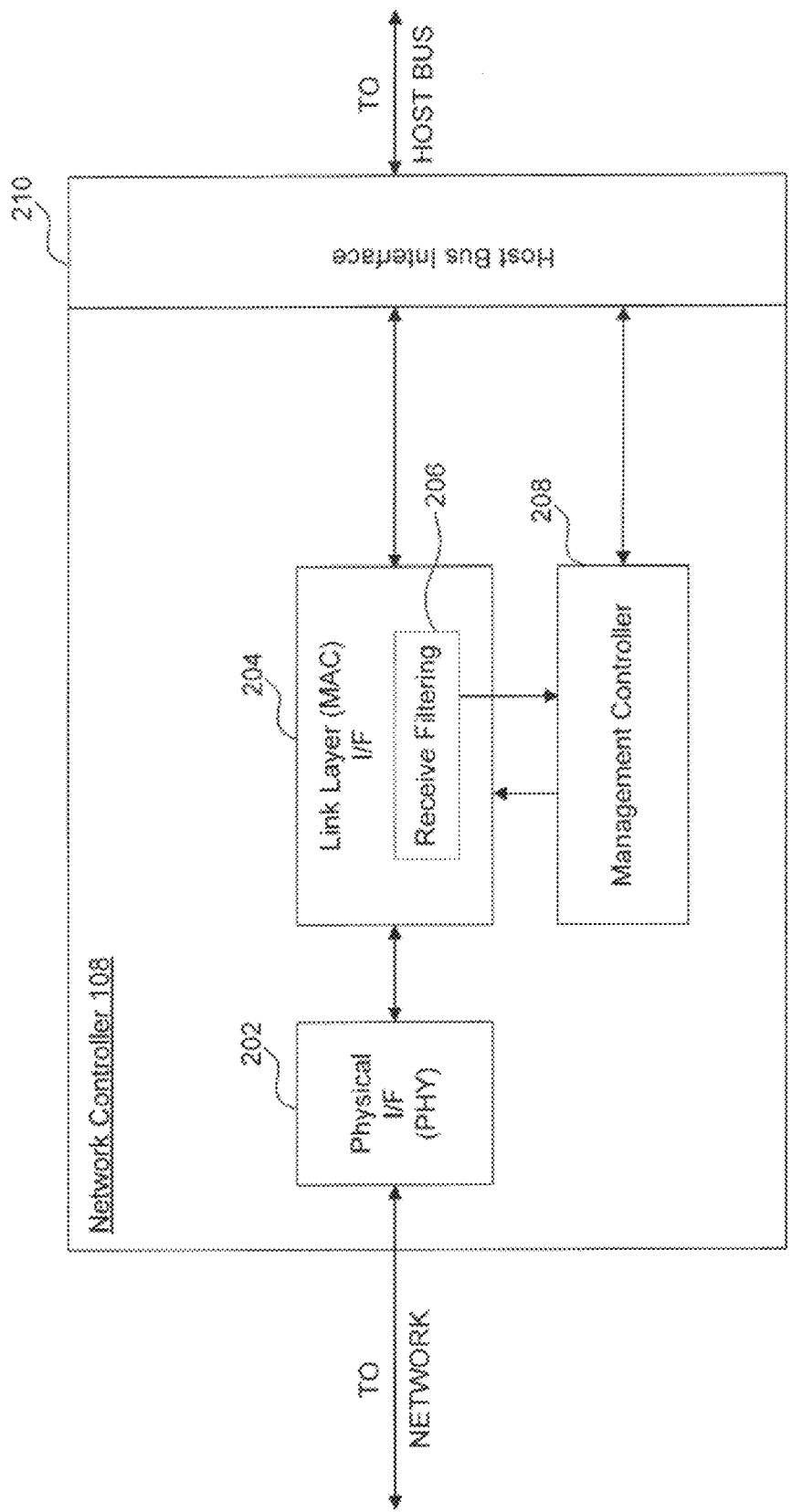
FIG. 2 illustrates a portion of a remote management network with further detail of the network controller, in accordance with an embodiment of the present invention.

FIG. 2 illustrates a portion of a remote management network 200 with further detail of the network controller 108, in accordance with an embodiment of the present invention. Network controller 108 includes a physical interface layer ("PHY") 202 and data link layer interface media access control ("MAC") 204, the operation of which would be understood by one skilled in the relevant art. MAC 204 includes a receive filtering module 206 which is configured to filter out power management data packets, in accordance with an embodiment of the present invention. In accordance with a non-limiting exemplary embodiment, power management packets are destined for a particular port (e.g., TCP port) at a network layer that can be directly understood by the receive filtering module 206.

The packets intercepted by receive filtering module 206 are forwarded to management controller 208, in accordance with an embodiment of the present invention. The remaining packets are forwarded to host bus interface 210, as with normal operation, which in turn forwards the packets on to the host bus for receipt by software components.

The management controller 208, alternatively known as the Application Processing Engine ("APE"), handles the processing of the intercepted power management packets. When management controller 208 receives a power management packet, it can determine the type of power management operation being requested and notify the managed system (e.g., managed system 106 of FIG. 1) of the requested power management operation.

III. Management Controller and Managed Client Operation

Figure 3:
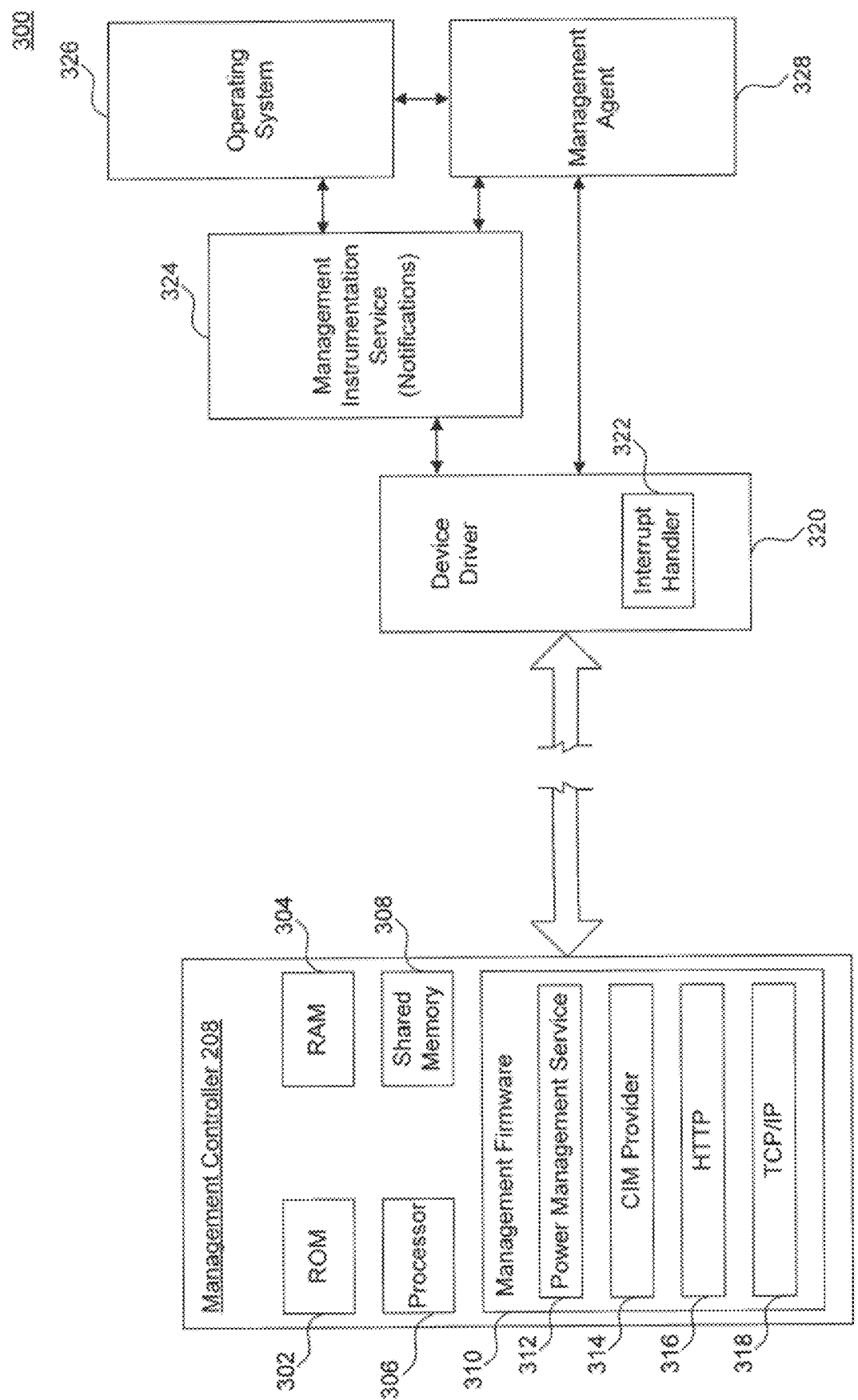
FIG. 3 illustrates components of a managed client, in accordance with an embodiment of the present invention.

FIG. 3 illustrates components of a managed client 300, in accordance with an embodiment of the present invention. Managed client 300 comprises management controller 208, which is part of network controller 108 as illustrated in FIG. 2, in communication with a host system (e.g., a personal computer on which an expansion card comprising network controller 108 is installed) fronted by a device driver 320. In accordance with an additional embodiment of the present invention, management controller 208 comprises a read-only memory ("ROM") 302, a random access memory ("RAM") 304, a processor 306, and a shared memory space 308. One skilled in the relevant arts will appreciate that other architectures may be utilized for management controller 208, and this particular architecture is provided by way of non-limiting example.

Management controller 208 also includes management firmware 310, in accordance with an embodiment of the present invention. Management firmware 310 is executed by processor 306 and is resident in RAM 304 during execution. The management firmware 310 includes modules for interpreting packets intercepted from the network communications managed by network controller 108, such as the intercepted power management packets. Although one skilled in the relevant arts will understand that the network stack utilized will vary, FIG. 3 shows a non-limiting example utilizing TCP/IP packets in which power management service packets are held. In the foregoing example, management firmware 310 includes modules for interpreting a network stack including TCP/IP 318, HTTP 316, Common Information Model ("CIM") data 314, and Power Management Service data 312.

When an intercepted power management packet is handled by management controller 208 (filtered based on its destination TCP port, in an embodiment), the various network protocol layers in the packet are deconstructed until power management service data 312 is obtained. In accordance with an embodiment of the invention, power management service data 312 includes both graceful and ungraceful power management service data, although one skilled in the relevant arts will appreciate that management controller 208 may be constructed to instead receive only graceful power management service data.

As will be described in further detail below, graceful power management service data is stored in shared memory 308, and a software component of the managed client 300 is notified. A region of shared memory 308 is reserved, in accordance with an embodiment of the present invention, for storing one or more graceful power management service instructions received by management controller 208 for eventual retrieval by a management agent 328. In a non-limiting exemplary embodiment, shared access to shared memory 308 is governed by one or more mutex (mutual exclusion) registers, blocking access when another component is manipulating shared memory 308 or a same portion of shared memory 308.

In accordance with an embodiment of the present invention, management controller 208 triggers an interrupt notification that causes the execution of code in interrupt handler 322 of device driver 320. By way of non-limiting exemplary embodiment, management controller 208 includes a register used for asserting the interrupt to a host system. Device driver 320 is the driver software installed on an operating system, such as operating system 326, to handle the software interface to network controller 108 on which management controller 208 is located. When management controller 208 asserts an interrupt, code present within interrupt handler 322 is triggered asynchronously, or "out-of-band" (i.e., at the moment of the interrupt notification).

When interrupt handler 322 is initiated, device driver 320 uses operations specific to operating system 326 for asynchronously communicating the "command pending" status to management agent 328. In a non-limiting exemplary embodiment, operating system 326 is the MICROSOFT WINDOWS operating system by MICROSOFT CORP. of Redmond, Wash., which uses the Windows Management Instrumentation service ("WMI") as the management instrumentation service 324 to notify management agent 328 of the "command pending" status. One skilled in the relevant arts will appreciate that other mechanisms can be used in other operating systems 326, and the foregoing is presented by way of example and not limitation. In addition, a polling mechanism, or other alternative, can be utilized in place of an interrupt mechanism.

IV. Notification of Host Capabilities

Figure 4:
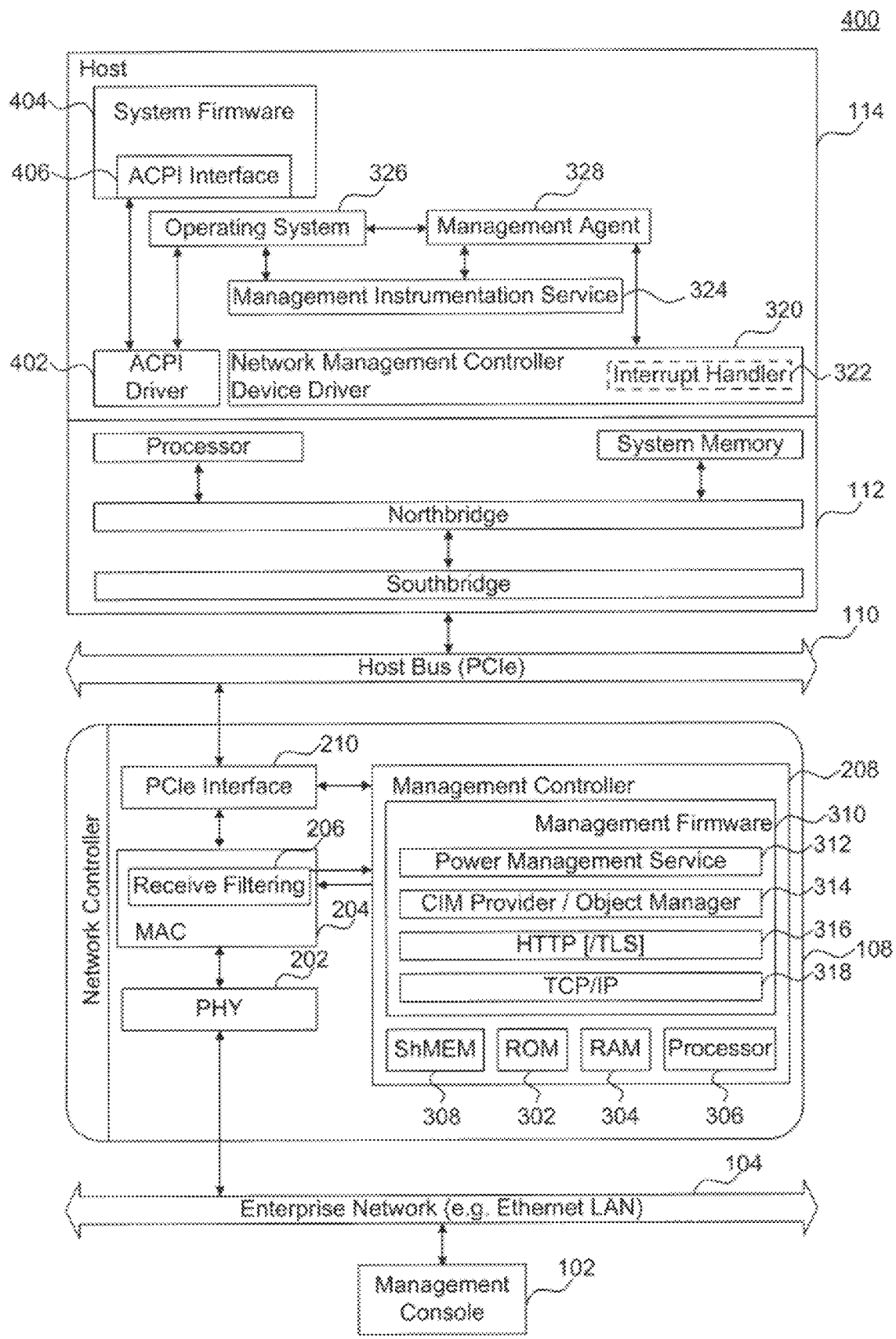
FIG. 4 illustrates a detailed view of a remote management network, in accordance with an embodiment of the present invention.

FIG. 4 illustrates a detailed view of a remote management network 400, in accordance with an embodiment of the present invention. Remote management network 400 comprises a number of elements previously discussed in the context of FIGS. 1-3. Additionally, FIG. 4 includes an Advanced Configuration and Power Interface ("ACPI") driver 402 and system firmware 404 comprising ACPI interface 406, in accordance with an embodiment of the present invention. These components allow the host (comprised of system hardware 112 and system software 114) to respond to standardized power management commands, including power-down, power-reset, sleep (ACPI S1/S2/S3) or hibernation (ACPI S4). In accordance with an embodiment of the present invention, the same ACPI protocols used for ungraceful power control are used for graceful, out-of-band power control.

Not all systems may have these capabilities, and as standards evolve some systems may have additional capabilities. Moreover, not all systems can handle these power management commands in a graceful, out-of-band manner. As a result, management controller 208 is notified of the commands available, and management console 102 is in turn notified of these commands as well.

Figure 5:
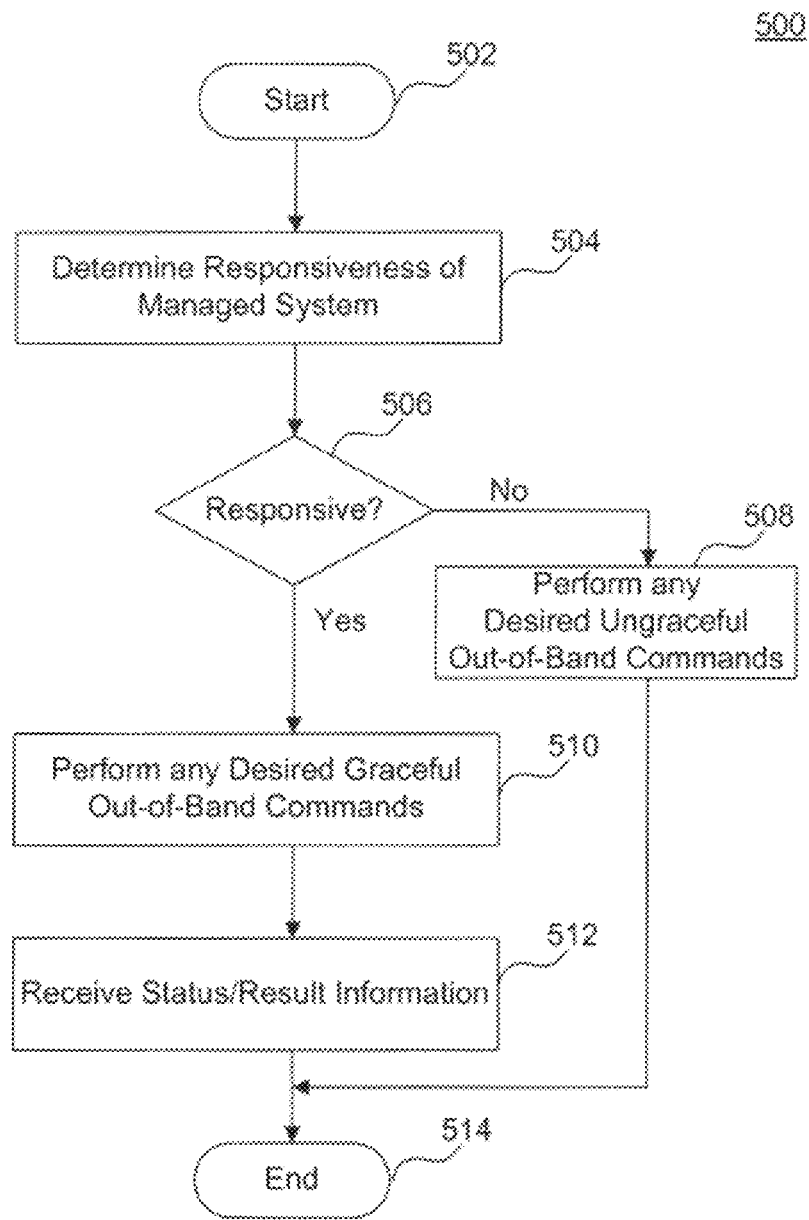
FIG. 5 is a flowchart illustrating steps by which remote detection of current power management capabilities is accomplished, in accordance with an embodiment of the present invention.

Accordingly, FIG. 5 is a flowchart 500 illustrating steps by which remote detection of current power management capabilities is accomplished, in accordance with an embodiment of the present invention. The method begins at step 502 and proceeds to step 504 where the responsiveness of a managed system is determined. By way of non-limiting example, if management agent 328 is hung, it may not be able to transmit a heartbeat to management controller 208 via device driver 322. Management controller 208 can then interpret this unresponsiveness as a sign that managed system 106 is hung. On the other hand, if the heartbeat has been received (or other appropriate mechanism), then management controller 208 understands managed system 106 to be responsive.

This responsiveness state, along with power management capabilities of managed system 106 (such as those provided by ACPI driver 402) allow management controller 208 to make a determination of which power management commands are available. Moreover, a list of available commands can be sent to management console 102 to restrict a remote administrator's options to those available. In accordance with an additional embodiment of the present invention, the determination of responsiveness at step 506 is made only if the managed system 106 is in power state S0 (i.e., the "ON" state, in the non-limiting ACPI system power state definition). As described in FIG. 6, below, management controller 208 can advertise out-of-band ungraceful power control commands that can be used to return managed system 106 to power state S0.

At step 506, if the managed system 106 is unresponsive (such as, e.g., because management agent 328 is unresponsive) and managed system 106 is in an expected power state (e.g., power state S0, as above), then the method proceeds to step 508 where only ungraceful power management commands are made available to management console 102. On the other hand, if managed system 106 is responsive, then the method proceeds to step 510 where graceful out-of-band commands are available to be used. At step 512, result status information for any graceful out-of-band command sent to managed system 106 for execution is received. The method then ends at step 514.

Figure 6:
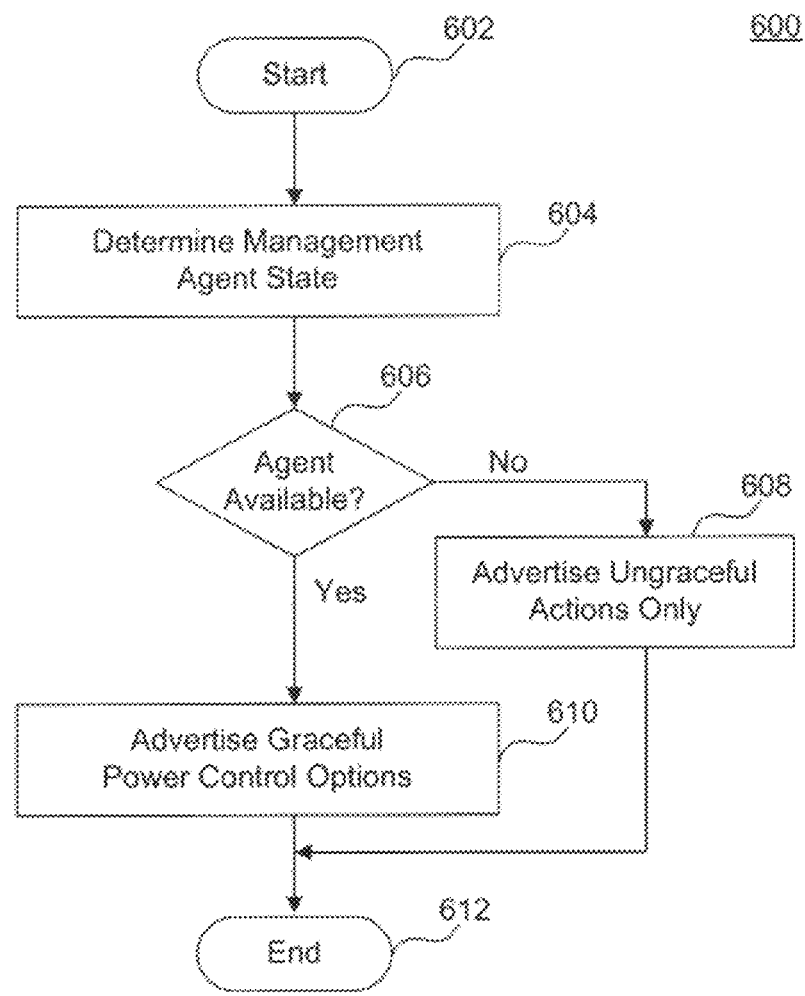
FIG. 6 is a flowchart illustrating steps by which a management controller advertises available power control commands, in accordance with an embodiment of the present invention.

In order for management console to be informed of the available commands, management controller 208 can be configured to advertise these commands and the responsiveness of management agent 328. FIG. 6 is a flowchart 600 illustrating steps by which management controller 208 advertises available power control commands, in accordance with an embodiment of the present invention. The method begins at step 602 and proceeds to step 604 where a determination is made as to the responsiveness of the management agent 328. As previously noted, if a heartbeat has not been received from management agent 328, it may be deemed unresponsive after some time. Accordingly, if at step 606 the management agent 328 is not available, then only ungraceful power control options are advertised as available at step 608. However, if management agent 328 is available, then graceful power control options are advertised as available at step 610. The method then ends at step 612.

V. Management Controller Operation

As shown in FIG. 4, in accordance with an embodiment of the present invention, data packets sent from management console 102 via network 104 are received by network controller 108. At receive filtering module 206, packets are inspected for particular characteristics known to network controller 108 to correspond to power control command. One such characteristic, as previously discussed, is a particular destination port being associated with the packet. These packets are intercepted and then handled by management controller 208.

Figure 7:
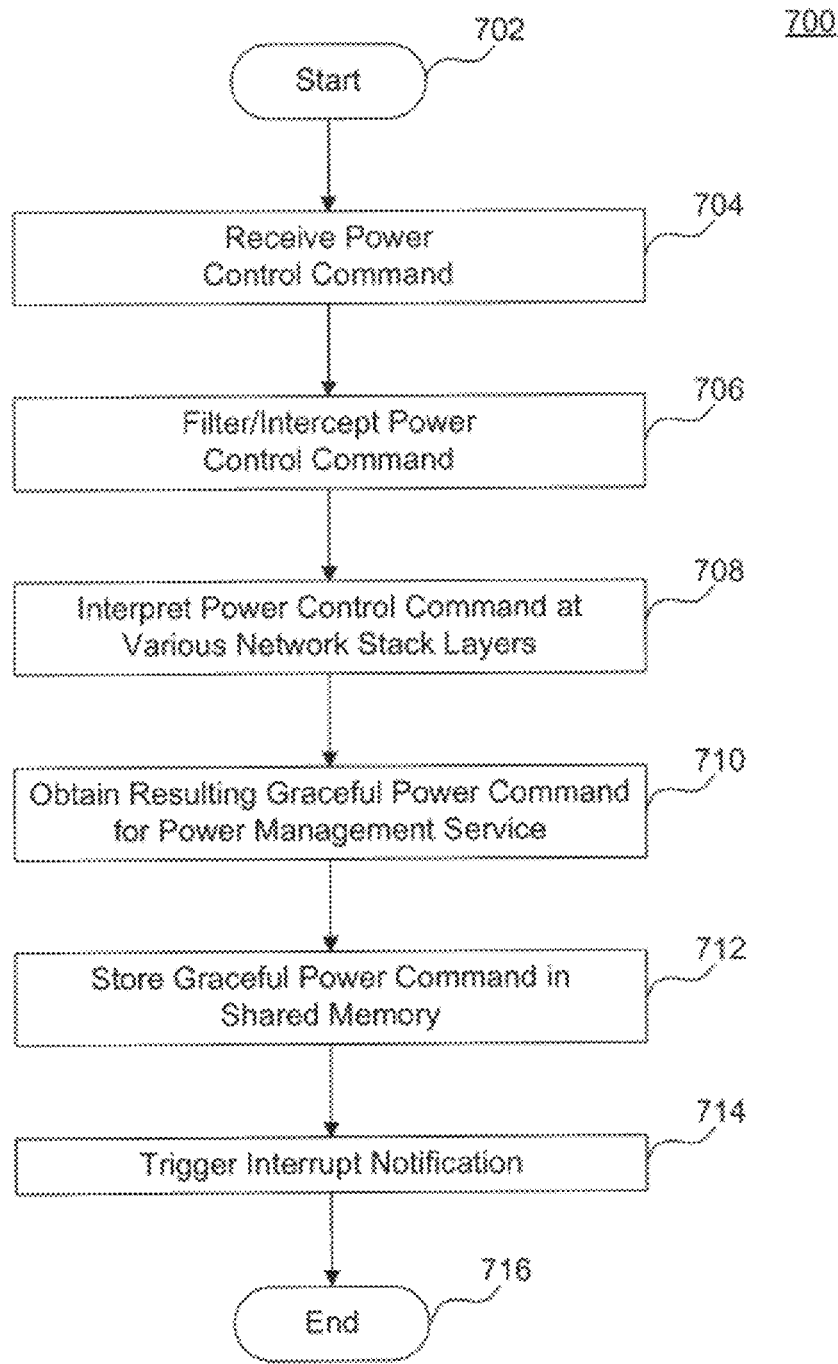
FIG. 7 is a flowchart illustrating steps by which a network controller processes a power command data packet, in accordance with an embodiment of the present invention.

FIG. 7 is a flowchart 700 illustrating steps by which a network controller, such as network controller 108, processes a power command data packet, in accordance with an embodiment of the present invention. The method begins at step 702 and proceeds to step 704 where a power control command is received. In a non-limiting exemplary embodiment, the power control command received at step 704 is contained in the form of a TCP/IP packet. At step 706, the power control command is filtered out from the communication stream for redirection to management controller 208 (rather than onward through to the host bus, such as PCIe interface 210 of FIG. 4).

The management controller firmware 310 then processes the power control command packet at step 708 in order to interpret communications made up of several network stack layers (e.g., OSI Reference Model or TCP/IP model). At step 710, a graceful power command that is handled (in an embodiment) at the application level is obtained from the power control command packet. This graceful power command is in a form usable by management agent 328 of FIG. 4 to affect the managed system's power state.

In order to provide the graceful power command to management agent 328, it is placed in a shared memory, such as shared memory 308 of FIG. 4, at step 712. Then, an interrupt notification is triggered at step 714 for handling by interrupt handler 322, informing device driver 320 that a graceful power command is ready to be read from shared memory 308. The method then ends at step 714.

VI. Management Agent Operation

When device driver 320 receives the out-of-band (asynchronous) notification of an available graceful power command within shared memory 308, it will in turn notify management agent 328 of the availability of the graceful power command. In accordance with an embodiment of the present invention, management agent 328 registers for such notifications from device driver 320 (e.g., via callback or via interrupt) through a management instrumentation service 324, although one skilled in the relevant arts will appreciate that a number of techniques may be utilized. This notification may also be out-of-band, thereby resulting in out-of-band notification of a graceful power command to the management agent 328.

Figure 8:
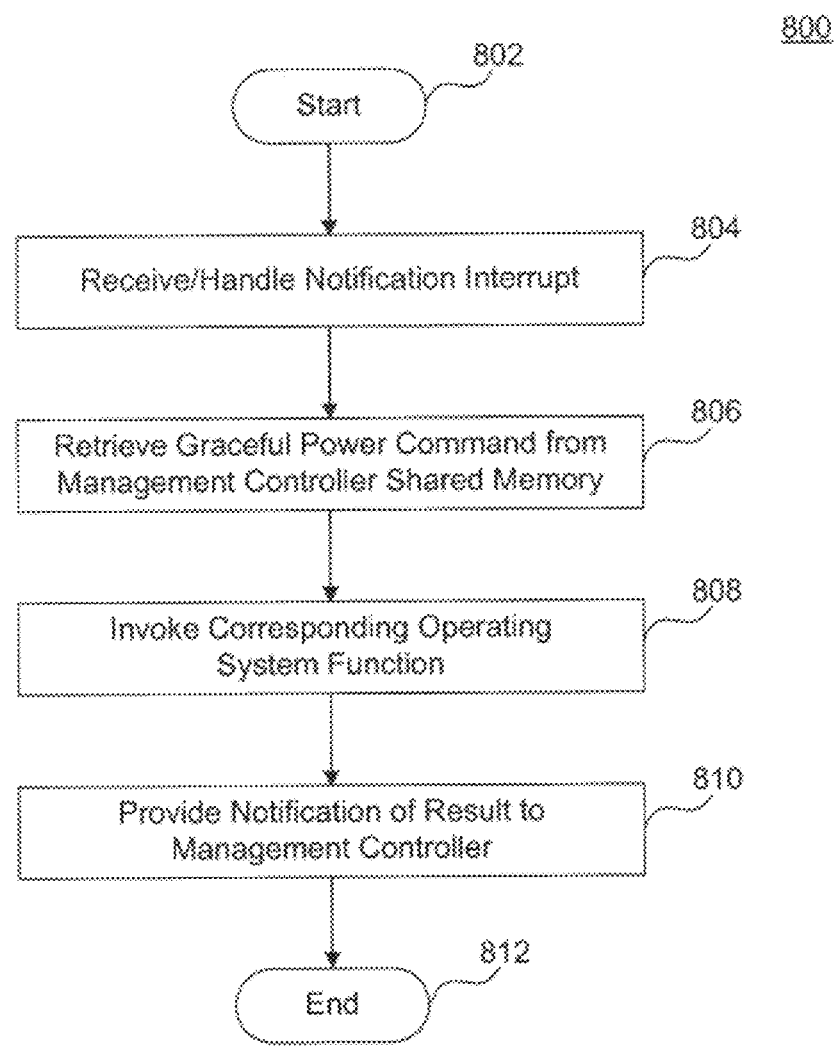
FIG. 8 is a flowchart illustrating steps by which a management agent responds to a graceful power command, in accordance with an embodiment of the present invention.

FIG. 8 is a flowchart 800 illustrating steps by which a management agent, such as management agent 328, responds to a graceful power command, in accordance with an embodiment of the present invention. The method begins at step 802 and proceeds to step 804 where management agent 328 receives an out-of-band notification of the availability of a graceful power command. The graceful power command is retrieved from shared memory 308. By way of non-limiting example, the graceful power command includes commands such as power-down, power-up, reboot, hibernate, etc.

Accordingly, at step 808, management agent 328 invokes a corresponding operating system 326 function that performs the graceful power command. The graceful power command includes functionality to prepare executing software (including the operating system 326 itself) for the power command, if necessary. The graceful power command further includes functionality to notify the hardware of managed system 106 of the graceful power command. In accordance with an embodiment of the present invention, the corresponding operating system 326 function notifies the hardware of managed system 106 of the graceful power command through ACPI driver 402 and system firmware 404 (via ACPI interface 406) in conformance with the ACPI standard, although one skilled in the relevant arts will recognize that other techniques of notifying the hardware of managed system 106. For example, if the graceful power command is a graceful shutdown, the operating system 326 is prepared for shutdown (e.g., writing out cache data, shutting down applications, unmounting drives, etc.) and, when ready, notifies the ACPI interface 406 to perform the corresponding power command on the hardware of managed system 106 (e.g., power down).

In accordance with a further embodiment of the present invention, management agent 328 can provide any result information back to management controller 208 at step 810. This can be accomplished by writing result information to shared memory 308, and providing a notification (or interrupt) to management controller 208 indicating that the result information is available. As previously noted, management controller 208 can provide such result information on to management console 102. The method then ends at step 812.

VII. Example Computer System Implementation

Figure 9:
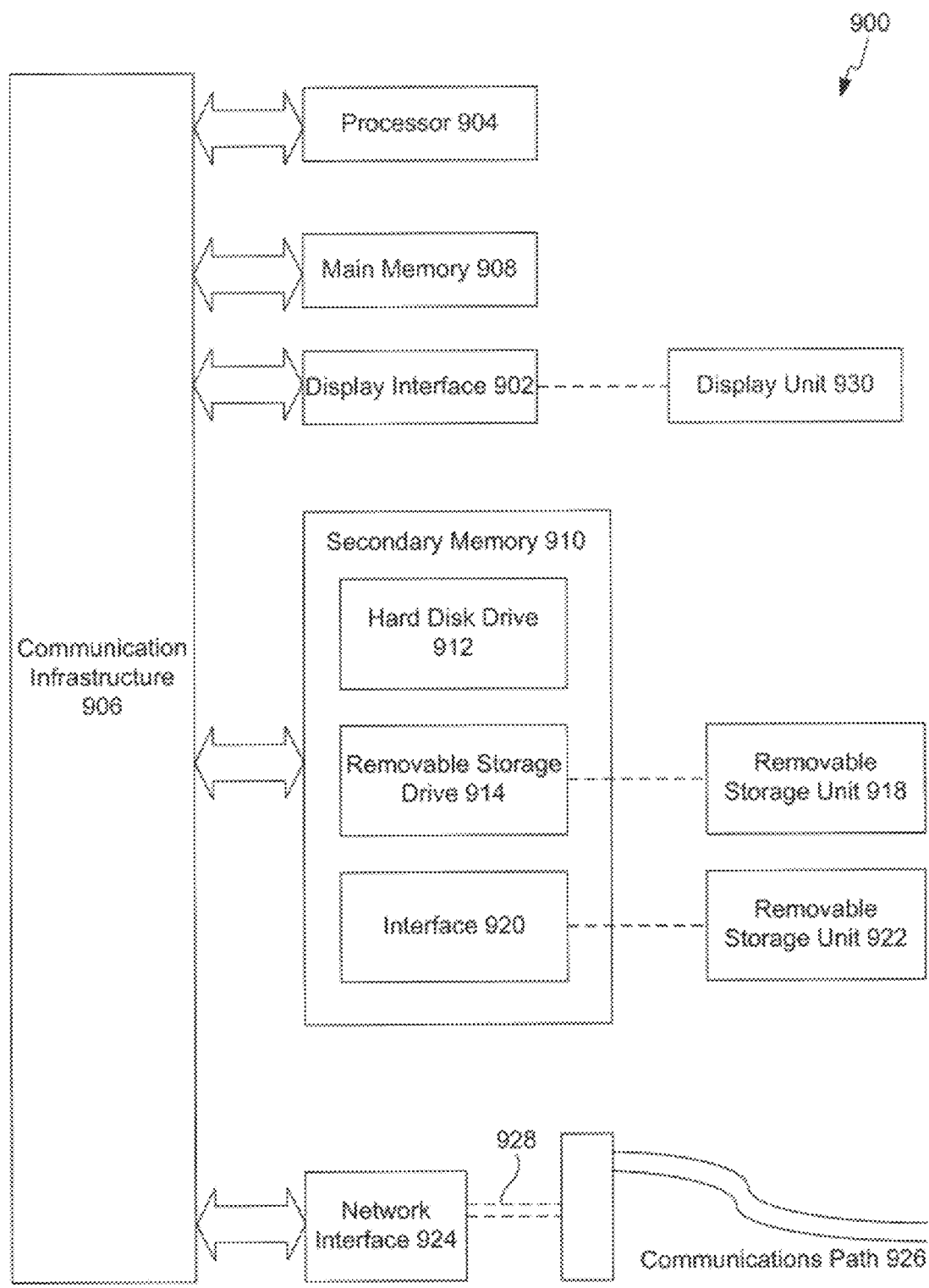
FIG. 9 depicts an example computer system in which embodiments of the present invention may be implemented.

Various aspects of the present invention can be implemented by software, firmware, hardware, or a combination thereof. FIG. 9 illustrates an example computer system 900 in which the present invention, or portions thereof, can be implemented as computer-readable code. For example, the methods illustrated by flowcharts 500 of FIG. 5, 600 of FIG. 6, 700 of FIG. 7, and 800 of FIG. 8, can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912, a removable storage drive 914, and/or a memory stick. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. that is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 that allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals that may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Signals carried over communications path 926 can also embody the logic described herein. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by flowcharts 500 of FIG. 5, 600 of FIG. 6, 700 of FIG. 7, and 800 of FIG. 8, discussed above. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VIII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method, comprising:
   filtering, by a filtering module of a network interface controller device configured to provide an interface between a network and a host interface, a network packet received from the network and comprising a graceful power control command, wherein the network packet is intercepted by the filtering module;
   interpreting, by the network interface controller device, the network packet to obtain the graceful power control command;
   storing, by the network interface controller device, the graceful power control command into a shared memory located in the network interface controller device;
   notifying, by the network interface controller device in an arrival notification, a power management agent service of arrival of the graceful power control command in the shared memory; and
   providing, by the network interface controller device, the graceful power control command from the shared memory to the power management agent service via the host interface in response to receipt of the arrival notification by the power management agent service, wherein an operating system function corresponding to the graceful power control command is invoked by the power management agent service.

2. The method of claim 1, further comprising:
   determining availability of the power management agent service; and
   sending a notification to a management console advertising available power management functions based on the availability of the power management agent service.

3. The method of claim 1, wherein filtering the network packet comprises:
   identifying the network packet comprising the graceful power control command based on a destination port for the network packet.

4. The method of claim 1, wherein notifying the power management agent service comprises: triggering an interrupt, wherein the triggering is out-of-band.

5. The method of claim 1, further comprising:
   receiving a result notification from the power management agent service; and
   sending a notification to a management console indicating a result of execution of the graceful power control command.

6. The method of claim 1, further comprising:
   receiving information from the power management agent service regarding power management capabilities.

7. The method of claim 1, further comprising:
   receiving information from the power management agent service regarding availability of the power management agent service.

8. A computer-readable storage device having computer-executable instructions stored thereon, execution of which, by a computing device, causes the computing device to perform operations comprising:
   filtering, by a filtering module of a network interface controller device configured to provide an interface between a network and a host interface, a network packet received from the network and comprising a graceful power control command, wherein the network packet is intercepted by the filtering module;
   interpreting, by the network interface controller device, the network packet to obtain the graceful power control command;

storing, by the network interface controller device, the graceful power control command in a shared memory located in the network interface controller device;

notifying, by the network interface controller device in an arrival notification, a power management agent service of arrival of the graceful power control command in the shared memory; and providing, by the network interface controller device, the graceful power control command from the shared memory to the power management agent service via the host interface in response to receipt of the arrival notification by the power management agent service, wherein an operating system function corresponding to the graceful power control command is invoked by the power management agent service.

9. The computer-readable storage device of claim 8, the operations further comprising:

determining availability of the power management agent service; and sending a notification to a management console advertising available power management functions based on the availability of the power management agent service.

10. The computer-readable storage device of claim 8, wherein filtering the network packet comprises:

identifying the network packet comprising the graceful power control command based on a destination port for the network packet.

11. The computer-readable storage device of claim 8, wherein notifying the power management agent service comprises: triggering an interrupt, wherein the triggering is out-of-band.

12. The computer-readable storage device of claim 8, the operations further comprising:

receiving a result notification from the power management agent service; and sending a notification to a management console indicating a result of execution of the graceful power control command.

13. The computer-readable storage device of claim 8, the operations further comprising:

receiving information from the power management agent service regarding power management capabilities.

14. The computer-readable storage device of claim 8, the operations further comprising:

receiving information from the power management agent service regarding availability of the power management agent service.

15. A system comprising:

a filtering module of a network interface controller device configured to provide an interface between a network and a host interface, the filtering module configured to intercept and filter a network packet received from the network and comprising a graceful power control command;

an interpreting module of the network interface controller device, the interpreting module configured to interpret the network packet to obtain the graceful power control command;

a storing module of the network interface controller device, the storing module configured to store the graceful power control command in a shared memory located in the network interface controller device;

a notifying module of the network interface controller device, the notifying module configured to notify, in an arrival notification, a power management agent service of arrival of the graceful power control command in the shared memory; and a providing module of the network interface controller device, the providing module configured to provide the graceful power control command from the shared memory to the power management agent service via the host interface in response to receipt of the arrival notification by the power management agent service, wherein an operating system function corresponding to the graceful power control command is invoked by the power management agent service.

16. The system of claim 15, further comprising:

a determining module configured to determine availability of the power management agent service; and a sending module configured to send a notification to a management console advertising available power management functions based on the availability of the power management agent service.

17. The system of claim 15, wherein the filtering module is further configured to identify the network packet comprising the graceful power control command based on a destination port for the network packet.

18. The system of claim 15, wherein the notifying module is further configured to trigger an interrupt, wherein the trigger is out-of-band.

19. The system of claim 15, further comprising:

a receiving module configured to receive a result notification from the power management agent service; and a sending module configured to send a notification to a management console indicating a result of execution of the graceful power control command.

20. The system of claim 15, further comprising:

a receiving module configured to receive information from the power management agent service regarding power management capabilities.

21. The system of claim 15, further comprising:

a receiving module configured to receive information from the power management agent service regarding availability of the power management agent service.

* * * * *

UNITED STATES PATENT AND TRADEMARK OFFICE
CERTIFICATE OF CORRECTION

| | | |
|---|---|---|
| PATENT NO. | : 9,026,629 B2 | Page 1 of 1 |
| APPLICATION NO. | : 13/015969 | |
| DATED | : May 5, 2015 | |
| INVENTOR(S) | : Rob Swindell | |

It is certified that error appears in the above-identified patent and that said Letters Patent is hereby corrected as shown below:

In the Claims

Column 10, line 13, please replace "command into a shared" with --command in a shared--

Signed and Sealed this
Eighteenth Day of August, 2015

Michelle K. Lee
*Director of the United States Patent and Trademark Office*